United States Patent [19]

Proksa et al.

[11] Patent Number: 5,143,946

[45] Date of Patent: Sep. 1, 1992

[54] PROCESS AND APPARATUS FOR THE PRODUCTION OF A FLOWABLE REACTION MIXTURE FROM AT LEAST TWO FLOWABLE REACTIVE COMPONENTS

[75] Inventors: Ferdinand Proksa, Leverkusen; Hans-Michael Sulzbach, Königswinter; Ferdinand Althausen, Neunkirchen; Helmut Duschanek, Königswinter; Reiner Raffel, Siegburg, all of Fed. Rep. of Germany

[73] Assignee: Maschinenfabrik Hennecke GmbH, Leverkusen, Fed. Rep. of Germany

[21] Appl. No.: 830,164

[22] Filed: Jan. 31, 1992

[30] Foreign Application Priority Data

Feb. 6, 1991 [DE] Fed. Rep. of Germany ....... 4103532

[51] Int. Cl.⁵ ............................................. C08G 18/00
[52] U.S. Cl. ....................................... 521/155; 528/44
[58] Field of Search .................. 521/155, 917; 528/44

[56] References Cited

U.S. PATENT DOCUMENTS 3,975,128 8/1976 Schluter ............................... 425/206
4,141,470 2/1979 Schulte et al. ...................... 425/130

FOREIGN PATENT DOCUMENTS 070486 1/1983 European Pat. Off. .

Primary Examiner—Morton Foelak
Attorney, Agent, or Firm—Joseph C. Gil

[57] ABSTRACT

A process and apparatus are described for the production of a flowable reaction mixture from at least two flowable reactive components which may be difficult to mix, which components react with one another to form a solid or a foam material. The components are injected into a mixing zone where they components are mixed in a continuous flow. The mixture flowing from the throttle zone is divided into two sub-streams which flow around a piston and which recombine opposite the division point.

3 Claims, 2 Drawing Sheets

PROCESS AND APPARATUS FOR THE PRODUCTION OF A FLOWABLE REACTION MIXTURE FROM AT LEAST TWO FLOWABLE REACTIVE COMPONENTS

BACKGROUND OF THE INVENTION

The present invention relates to a process and apparatus for the production of a flowable reaction mixture from at least two flowable reactive components. The components react with one another to form solid material or foam material. The reactive components are injected into a mixing chamber and are mixed in a continuous flow. The mixture stream issuing from the mixing zone is throttled, as known from European patent 70,486.

A mix head for a similar process is disclosed in German patent 2,327,269 and U.S. Pat. No. 3,975,128. In the process described in these references, an outlet channel is arranged at right angles directly downstream of the mixing chamber. The outlet channel stabilizes the reaction mixture and can be cleaned by the associated discharging piston. It has been attempted to use the discharging piston to throttle the reaction mixture stream issuing from the mixing chamber. In the case of reactive components which are difficult to mix, throttling makes it difficult to stabilize the mixture stream to an adequate extent before it enters the mold cavity. Thus, the reaction mixture splashes out of the exit opening of the outlet channel and does not form a closed flow front.

Another known mix head (see, German patent 2,612,812 and U.S. Pat. No. 4,141,470) uses a transverse slide which is disposed, as throttling component, between the mixing chamber and the outlet pipe and which is provided with a through-flow opening. The desired through-flow cross-section can be adjusted by displacing this throttling component. In order to clean the mixing chamber and outlet pipe, the throttle slide is brought into the cleaning position so that the discharging piston can pass through the through-flow opening. This mix head has a relatively long structural length. With this mix head, it is difficult to precisely control the throttling component and the discharging piston to prevent these two elements from colliding. The resultant long structural length of the discharging piston is also unfavorable since it is possible that a film of reaction mixture may remain between the discharging piston and the walls of the mixing chamber and the outlet pipe may cause the discharging piston to adhere to the walls leading to the blockage of the piston. To prevent this from occurring, an over-sized drive means must be provided for the discharging piston. Because of the risk that the discharging piston may buckle, it must possess a specific minimum diameter relative to its length. Therefore the cross-sectional dimensions of the mixing chamber and the outlet pipe cannot be as small as desired. A further disadvantage is that the cross-sections of the mixing chamber and the outlet pipe must be identical.

Although the device according to European patent 70,486, does not possess the disadvantages of the aforementioned mix heads, it does require a large structural outlay and consequently is of an unwieldy size. In this device, the mixture stream is throttled on exit from the mixing chamber and then passes tangentially into a cyclone stream.

The goal of the present invention was to provide a process and an apparatus wherein even when processing reactive components which are difficult to mix, the rapid stabilization of the mixture stream following throttling is further improved. The new apparatus must require a lower structural outlay and possesses small dimensions. Finally, the apparatus must not be susceptible to breakdown, must be operationally reliable and must be self-cleaning.

DESCRIPTION OF THE INVENTION

Figure 1:
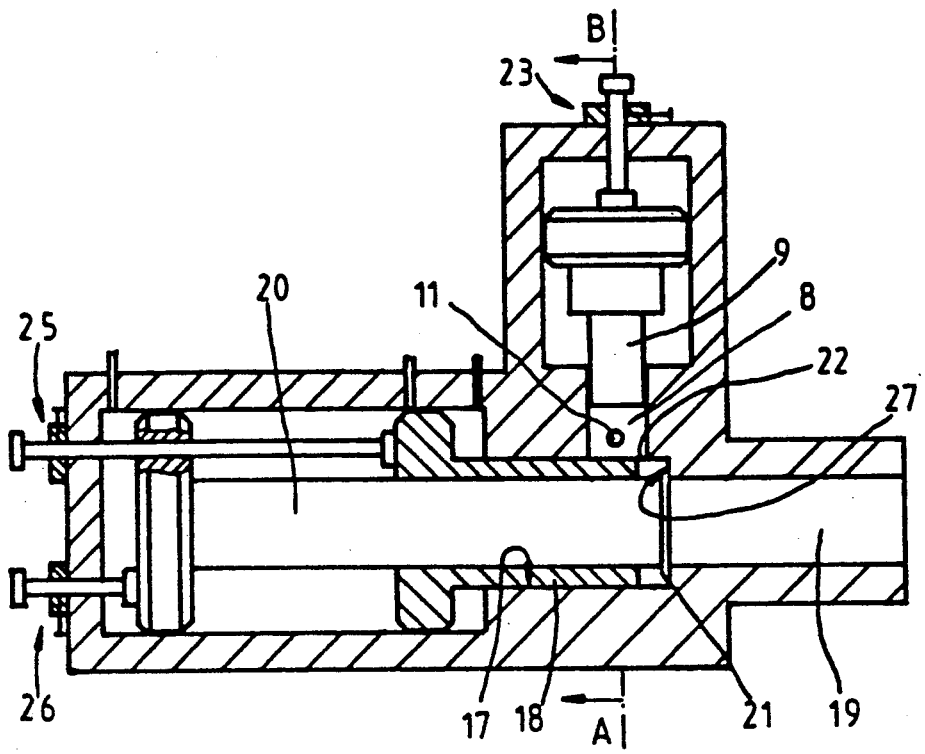
FIG. 1 is a longitudinal sectional view through the apparatus in the operating position.
Figure 2:
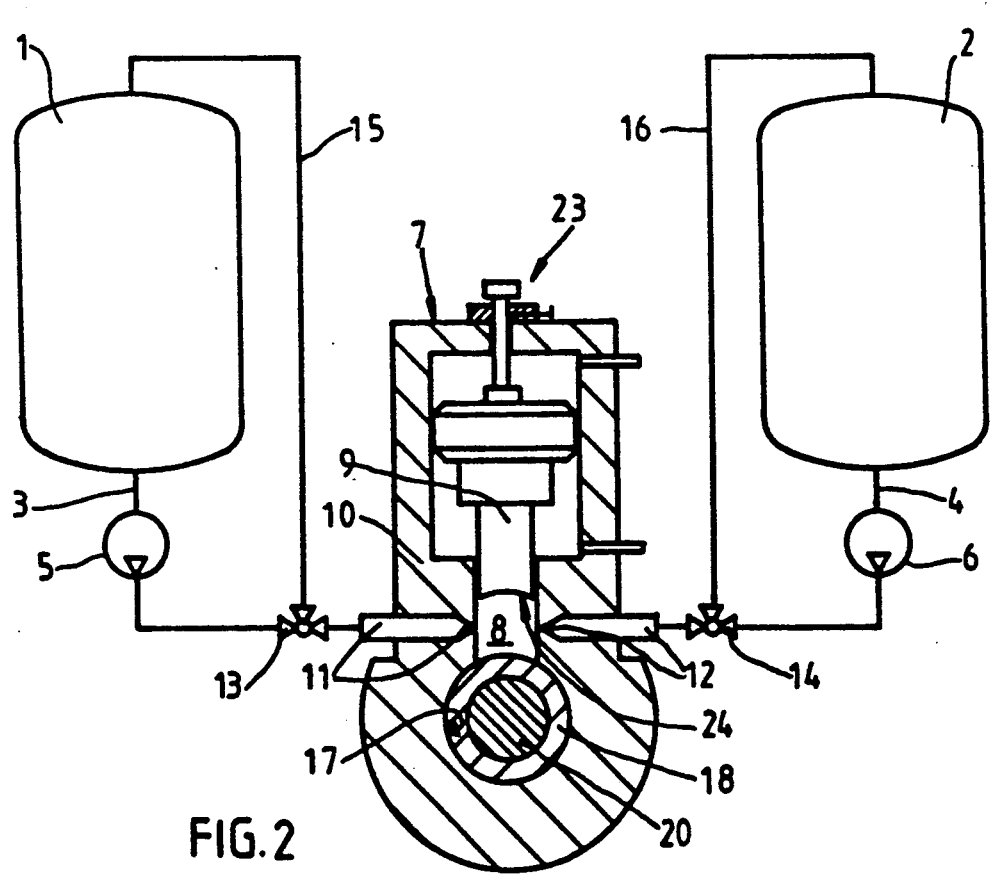
FIG. 2 is a sectional view along the line A-B of FIG. 1.

The above noted goals are attained by throttling the reaction mixture, dividing the throttled mixture into two sub-streams which flow around a core and which recombine opposite the division point and form a sink stream (negative source stream) at right angles to themselves. In this way, the mixture stream issuing from the throttling stage is divided into two arms and, by forming a channelled annular stream, is collected in splash-free fashion. The annular stream is already substantially stabilized and is discharged, as a sink stream, into an outlet channel which serves as sink. In particular, as a result of the novel formation of a sink stream, splashes do not form at all.

Preferably the sink stream can be adjusted with respect to the inflow speed and the inflow angle. As a result, the process conditions can be adapted to the requirements of different kinds of reaction mixtures with respect to their properties, and in particular, their viscosity.

In accordance with one preferred embodiment of the new process, in a follow-up control step to terminate the mixing procedure, the supply of the reactive components is interrupted, the mixing zone is emptied, the throttling is discontinued and the mixture residues are expelled. In this way, no mixture residues remain in, and pollute, the system by hardening.

The new apparatus for the production of a flowable reaction mixture comprises:
(a) feed containers, from which
(b) supply lines lead via dispensing pumps to a
(c) mix head, said mix head comprising:
  1) a housing containing
  2) a mixing chamber in which a discharging piston is mounted and into which the supply lines lead via injection nozzles, said mixing chamber opening into a guide bore of said housing disposed transversely to said mixing chamber,
  3) a throttle slide disposed in said guide bore,
  4) an outlet channel located in said guide bore through which the reaction mixture exits said mix head, and
  5) a cleaning piston capable of cleaning said outlet channel, wherein said throttle slide concentrically surrounds said cleaning piston.

The novelty of the invention resides in arranging the throttle slide in the guide bore concentrically around the cleaning piston, where the guide bore extends beyond the outlet of the mixing chamber in the direction of flow of the mixture. In the mixing phase, the throttle slide forms an annular channel with the front end of the cleaning piston, which annular channel leads into the outlet channel. This ensures that the mixture stream issuing from the throttling gap formed between the mixing chamber outlet and the throttle slide cannot directly enter the outlet channel but first enters an annular channel which is formed by the walls of the guide bore and by the cleaning piston which projects beyond the throttle slide. From this annular channel the reaction mixture then is discharged between the junction edge of the guide bore and the outlet channel to the end edge of the cleaning piston as a sink stream, where the sink is formed by the outlet channel. Due to the concentric arrangement of the throttle slide and the cleaning piston, the apparatus has a very compact structure. Collisions between the pistons and the throttle slide are not possible. It has also proved that no material forms on the annular step surface at the junction between the guide bore and the outlet channel, because the abutting throttle slide completely pushes away any mixture residues.

Preferably the throttling position of the throttle slide is adjustable. In this way the throttling gap and throttling cross-section can be adapted as desired to the requirements of the particular reaction mixture being prepared. In effect, it is thus possible to influence the arrangement of the mixing chamber.

In accordance with one embodiment, the rear dead-center position of the cleaning piston is adjustable. In this way, it is possible to adjust the size of the outlet gap from the annular channel formed between the walls of the guide bore and the cleaning piston, whereby the outflow speed and the outflow angle from the annular channel, which corresponds to the inflow angle into the outlet channel, can be adjusted.

An embodiment, wherein the rear dead-center position of the discharging piston of the mixing chamber is adjustable, is also particularly advantageous. As a result of this adjustability, the volume of the mixing chamber can be changed and adapted to the requirements, which can be particularly advantageous in the case of reactive components which are difficult to mix. The injection nozzles must, of course, remain open during the mixing process.

In the drawing, an apparatus in accordance with the invention is illustrated purely schematically in the form of an exemplary embodiment, where the mixing head itself is shown in detail, but the additional assemblies have merely been represented symbolically.

From feed containers 1, 2 for polyol and polyisocyanate respectively, supply lines 3, 4 lead via dispensing pumps 5, 6 to a mix head 7. The mix head contains a mixing chamber 8 in which a discharging piston 9 is mounted. In the housing 10 of the mixing head 7 are mounted injection nozzles 11, 12 via which the supply lines 3, 4 lead into the mixing chamber 8. Switch-over valves 13, 14 allow the reactive components to be returned via the return lines 15, 16 into the feed containers 1, 2. Arranged downstream of the mixing chamber 8, transversely thereto, is a guide bore 17 for a throttle slide 18 which concentrically surrounds a cleaning piston 20 mounted in an outlet channel 19. As the guide bore 17 has a larger diameter than the outlet channel 19 and the cleaning piston 20, an annular channel 21 (see FIG. 1) is formed, where the outlet 22 of the mixing chamber 8 leads into said annular channel 21. The discharging piston 9 is assigned an adjusting device 23 which comprises an adjustable stop by means of which the rear dead-center position is adjustable. The front dead-center position is structurally adjusted such that the end face 24 of the discharging piston 9 is aligned with the walls of the guide bore 17 and thus bears against the throttle slide 18 (see FIGS. 3 and 4). Both the throttle slide 18 and the cleaning piston 20 are equipped with adjusting devices 25 and 26 respectively, composed of fixable stops, for the rear dead-center positions. The front dead-center position of the throttle slide 18 is formed by the step 27 at the junction between the guide bore 17 and the outlet channel 19. The front dead-center position of the cleaning piston 20 corresponds to the end of the outlet channel 19.

Figure 3:
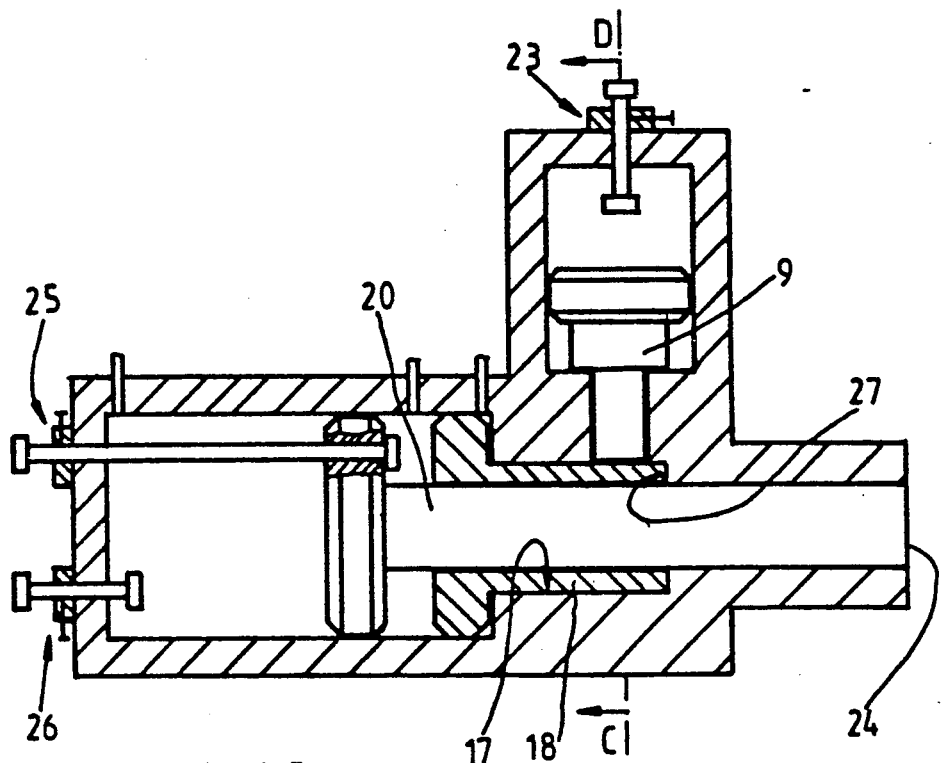
FIG. 3 is a longitudinal sectional view through the apparatus in the rest position; and, FIG. 4 is a sectional view along the line C-D of FIG. 3.
Figure 4:
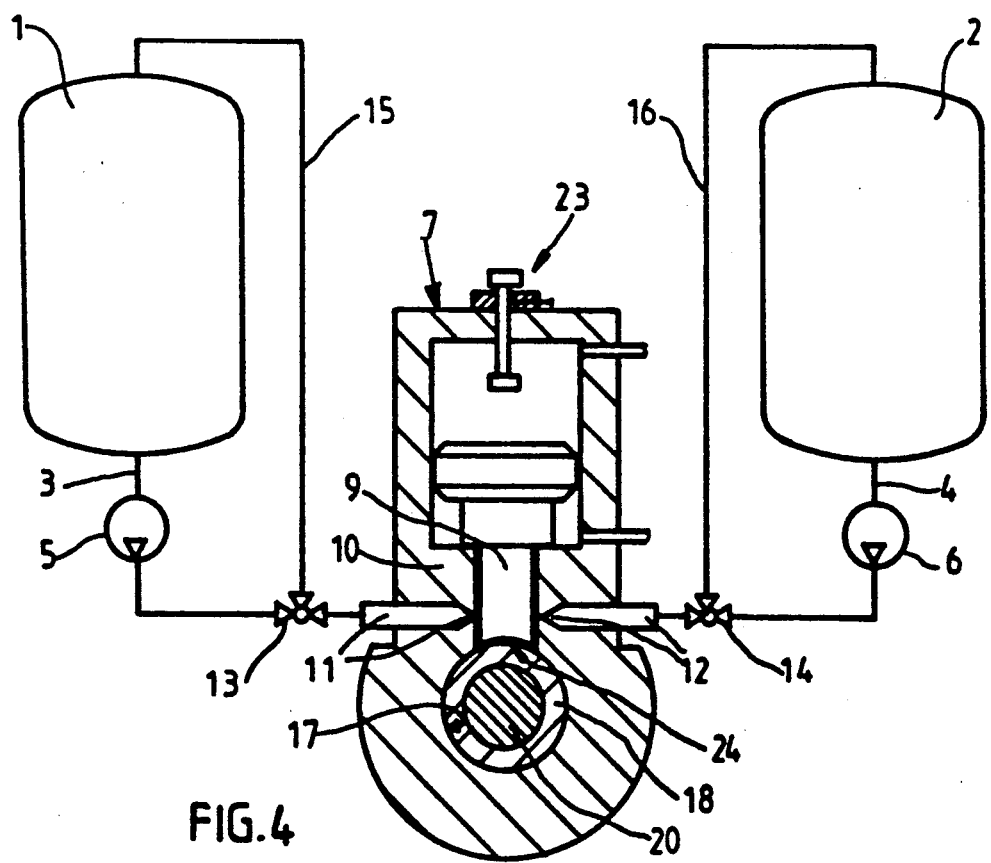

Commencing from the position of the pistons and the throttle slide illustrated in FIGS. 3 and 4, the mode of operation will now be explained. The switch-over valves 13 and 14 are switched to recirculation. The cleaning piston 20, the throttle slide 18 and the discharging piston 9 are moved to their rear dead-center positions. The dead-center positions are pre-adjusted to the desired setting by means of the adjusting devices 23, 25 and 26. The switch-over valves 13 and 14 are then reversed and the reactive components flow though the inflow nozzles 11 and 12 into the mixing chamber 8, where they are turbulently mixed and enter the annular channel 21 through the outlet 22 which forms the throttling gap. The mixture stream now divides and flows around that end of the cleaning piston 20 which projects beyond the throttle slide 18, and is discharged as a sink stream into the outlet channel 19. When the required quantity of mixture has been mixed, the switch-over valves 13 and 14 are switched to return flow and the discharging piston 9 assumes the front dead-center position, empties the mixing chamber 8. The throttle slide 18 then assumes its front dead-center position and thereby urges the reaction mixture out of the annular channel 21 by filling said channel. Finally the cleaning piston 20 empties the outlet channel 19 by assuming its front dead-center position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a flowable reaction mixture from at least two flowable reactive components which react with one another to form a solid or a foam material, comprising injecting the reactive components into a mixing zone where said components are mixed in a continuous flow, throttling the mixture stream issuing from the mixing zone, dividing the throttled mixture into two sub-streams which flow around a piston and which recombine opposite the division point and form a sink stream (negative source stream) at right angles to themselves.

2. The process of claim 1, wherein said sink stream is adjustable with respect to inflow speed and inflow angle.

3. The process of claim 1, wherein in order to terminate the mixing procedure, the supply of the reactive component is interrupted, the mixing zone is emptied, the throttling is discontinued and the mixture residues are ejected.

* * * * *